United States Patent [19]

Faughn

[11] Patent Number: 5,361,505

[45] Date of Patent: Nov. 8, 1994

[54] PROJECTILE RAM DEPTH AND ORIENTATION GAUGE FOR A CANNONTUBE

[75] Inventor: Jim A. Faughn, Bel Air, Md.

[73] Assignee: The United States of America as represented by the Secretary of the Army, Washington, D.C.

[21] Appl. No.: 55,456

[22] Filed: May 3, 1993

[51] Int. Cl.⁵ .......................... G01B 3/46; G01B 5/18; G01B 5/25

[52] U.S. Cl. ......................................... 33/506; 33/833; 33/542

[58] Field of Search .................. 33/506, 832, 833, 836, 33/533, 542, 544, 544.5, 544.6, 542.1

[56] References Cited

U.S. PATENT DOCUMENTS

| | | |
|---|---|---|
| 2,387,645 | 10/1945 | Cook ........................................ 33/506 |
| 2,502,613 | 4/1950 | Zanolio ..................................... 33/506 |
| 2,544,158 | 3/1951 | Henderson ............................... 33/506 |
| 3,780,438 | 12/1973 | Stycynski ................................. 33/506 |
| 4,348,812 | 9/1982 | Middleton . | 
| 4,608,762 | 9/1986 | Varner ..................................... 33/506 |
| 4,982,505 | 1/1991 | Pocci ....................................... 33/542 |
| 5,097,423 | 3/1992 | Badinger ................................. 33/833 |
| 5,170,569 | 12/1992 | Anderson ............................... 33/506 |
| 5,233,124 | 8/1993 | Peterson ................................. 33/506 |

*Primary Examiner*—Christopher W. Fulton
*Attorney, Agent, or Firm*—Freda L. Krosnick; Muzio B. Roberto; Walter R. Baylor

[57] ABSTRACT

A combination gauge measures (1) the depth of the projectile inside a cannontube bore after the projectile has been rammed and seated in the lands and grooves of the rifling of the cannontube and (2) any angular deviation of orientation of the rammed/seated projectile normal to the centerline of the cannontube. A data logger electronically records the measured data and a computer stores and analyzes the data.

23 Claims, 3 Drawing Sheets

5,361,505

PROJECTILE RAM DEPTH AND ORIENTATION GAUGE FOR A CANNONTUBE

GOVERNMENTAL INTEREST

The invention described herein may be manufactured, used, and licensed by or for the U.S. Government without payment to me of any royalty thereon.

BACKGROUND OF THE INVENTION

1. Field of Invention

The present invention relates to a combination projectile ram depth and orientation gauge which is operatively insertable into a breech area of a cannon/gun tube. (the terms cannontube and guntube are used interchangeably herein; cannontube is used henceforth for brevity). More specifically, the invention relates to a gauge for measuring (1) the depth of the projectile inside the cannontube bore after the projectile has been rammed and seated into the lands and grooves of the rifling of the cannontube with respect to the cannontube face and (2) any angular deviation of orientation of the seated projectile from its normal position with respect to the centerline of the breech chamber and the cannontube.

2. Description of the Prior Art

Artillery weapons in the past have typically been area weapons which deliver their munitions in a general area with no pinpoint accuracy or precision. However, today's artillery has taken advantage of the advances in technology, whereby the weapons are becoming more accurate with surgical precision capabilities and are not simply area weapons. With current investigations directed in making area weapons into extremely accurate pieces, it is understandable why much effort is being devoted to make this conversion. Much of this investigative effort is directed to the interior ballistics of the powder chamber and to the seating of the projectile. The difference of the rammed depth of the projectile may increase or decrease the interior volume of the effective powder chamber and consequently the muzzle velocity of the projectile. This ultimately effects accuracy of the terminal ballistics and point of impact of the projectile.

The firing of a field artillery cannon requires several operational steps to insure its safety and performance during use, especially during investigative and scientific test firing of the cannon. One such safety test is to measure the depth of the projectile inside the cannontube bore after the projectile has been rammed and seated in the lands and grooves of the rifling of the cannontube. This measurement is done to insure that the projectile's rotating band is engraved into the rifling grooves with sufficient depth to prevent a fall-back or a blow-by condition. The fall-back condition means the projectile is not sufficiently rammed and seated in the rifling grooves. This condition allows the projectile to fall back away from the rifling grooves and onto the powder charge when the cannontube is elevated. When this condition occurs and the cannon is fired, the projectile is not able to travel down the cannontube. The heated gases from the burning propellent can initiate detonation of the fuse and/or can cause the discharge of the high explosive charge in the projectile. Obviously, this can be a catastrophic situation. Another safety test for measuring the ram depth is the determination that the projectile is seated at a sufficient depth to not only hold the projectile in a rigid position while elevating the cannontube, but to also ensure that the rotating band has engraved sufficiently into the lands and grooves of the rifling to prevent the blow-by condition. The blow-by condition results when the projectile is seated in the rifling just enough to hold it in place but does not completely seal all the voids between the lands and grooves, thus allowing an exit route for the propelling gases from the burning powder charge. This results in a condition known as a sticker. The cannon has fired but the projectile has stuck somewhere in the cannontube. This condition may be catastrophic also, since the projectile is now super heated, very unstable, and may spontaneously detonate.

There is no known prior art publications in the cannontube art relating to gauge devices for the purpose of measuring the ram depth of the seated projectile. Prior to this invention, Applicant used a seating gauge to measure the seated or rammed depth of a projectile in the cannontube bore. This gauge was constructed from wood in a T shape with a short horizontal leg normal to a long vertical leg. The short leg rested against the face of the breech and allowed the long leg to travel into the breech until it touched the base of the projectile. This long leg had a rigid tape measure attached to it and when it touched the base of the projectile it was locked in place with a thumb screw. The gauge was then removed from the cannontube and the ram distance was read from the end of the long leg to the breech side of the supporting leg.

In using this wooden gauge a number of disadvantages have been encountered. For example, it is readily easy for a number of individuals to use the same gauge in the same rammed projectile situation and to obtain different readings. However, with the gauge of the present invention, it is possible at the same setting to derive repeatable and accurate measurements, resulting in consistent and meaningful data acquisition.

3. Specific Prior Art

U.S. Pat. No. 3,780,438, entitled Rifling Lands Inspection Gage and issued Dec. 25, 1973 to Styczynski, discloses a gage for inspecting the lands of a rifled barrel bore for erosion.

U.S. Pat. No. 4,348,812, entitled Gun Barrel Internal Diameter Indicator and issued on Sep. 14, 1982 to Middleton, discloses an indicator or gauge for measuring and checking the internal diameter of a gun barrel.

U.S. Pat. No. 4,982,505, entitled Gauge for Measuring Both the Depth and the Diameter of a Bore Hole and issued on Jan. 8, 1991, discloses a gauge for measuring both the depth and the diameter of a bore hole.

U.S. Pat. No. 5,170,569, entitled Device for Measuring Dimensions to Calculate the Head Space for Guns and issued on Dec. 15, 1992 to Anderson, discloses a device for measuring dimensions to calculate the head space for guns.

4. Statement of the Invention

The combined depth and orientation gauge of the present invention represents an improvement over the known prior art a over the above-mentioned wooden gauge. The gauge of the present invention is used for measuring and verifying two different parameters or dimensions; namely, (1) the depth that the projectile has been rammed and seated into the lands and grooves of the cannontube bore rifling (which engraves into the rotating band of the projectile); this is also known as the seated or rammed depth, with respect to the face of the cannontube or breech area; and (2) the angular deviation measurement of orientation of the seated projectile from its proper position in the center of the bore area of the cannontube, with respect to the cannontube centerline.

The gauge of the present invention improves the accuracy and consistency of readings from round to round and from operator to operator. This is accomplished by consistently centering the gauge in the center of the bore area, by centering the length measurement's contact point on the center of the projectile base, and by eliminating the inconsistent play and slop from using the wooden gauge.

The gauge of the present invention is a combination gauge in that it not only measures the depth of ram of the seated projectile, but also measures the deviation of orientation of the projectile from the normal. Measuring the deviation of the orientation of the projectile is required in order to determine what effect canting of the projectile in the cannontube bore has on accuracy. If the projectile is not perfectly centered and the cannon is fired, the projectile may travel down the cannontube bore in an unorthodox manner, which may have significant effects on the exit orientation of the projectile and eventually terminal accuracy. The present invention solves these problems by measuring both the ram depth of the projectile and the seated orientation of the projectile with a single insertion of the gauge into the cannontube. Further, the measured depth readings and the orientation information are electronically recorded in a data logger and stored and analyzed by a computer.

SUMMARY OF THE INVENTION

The present invention relates to a portable bore gauge device for quickly and accurately quantifying the measurements of the seated depth of a rammed projectile and also for checking or verifying any deviation of orientation of the projectile from normal with respect to the centerline of a cannontube, which the base plane of the projectile defines.

Accordingly, it is an object of the present invention to provide a ram depth and orientation gauge which defines both the ram depth of a seated projectile and its orientation within the cannontube bore accurately to within several thousandths of an inch.

It is a further object of the invention to provide a ram depth and orientation gauge which aligns itself by means of hydraulically actuated locator points or pad members to the centerline of a cannontube and also locks itself in an immobile position.

It is still a further object of the invention to provide a ram depth and orientation gauge which maintains itself on a centerline of a cannontube by utilizing replaceable locator points or pad members of appropriate dimensions for each different cannontube.

Still a further object of the invention is to provide a combination ram depth and orientation gauge which eliminates the possibility of human error by establishing repeatable locator points or pad members, by utilizing a digital caliper means for measuring the ram depth, by utilizing digital depth micrometers/depth gauges for measuring the projectile orientation, by recording the data into a data logger, and by storing and analyzing the data in a computer.

Other objectives of the present invention will be apparent from the following detailed description of the invention.

BRIEF DESCRIPTION OF THE DRAWINGS

The foregoing and other objects, aspects, uses, and advantages of the present invention will be more fully appreciated as the same becomes better understood when considered in connection with the following accompanying drawings, in which.

DETAILED DESCRIPTION OF THE INVENTION

Figure 1:
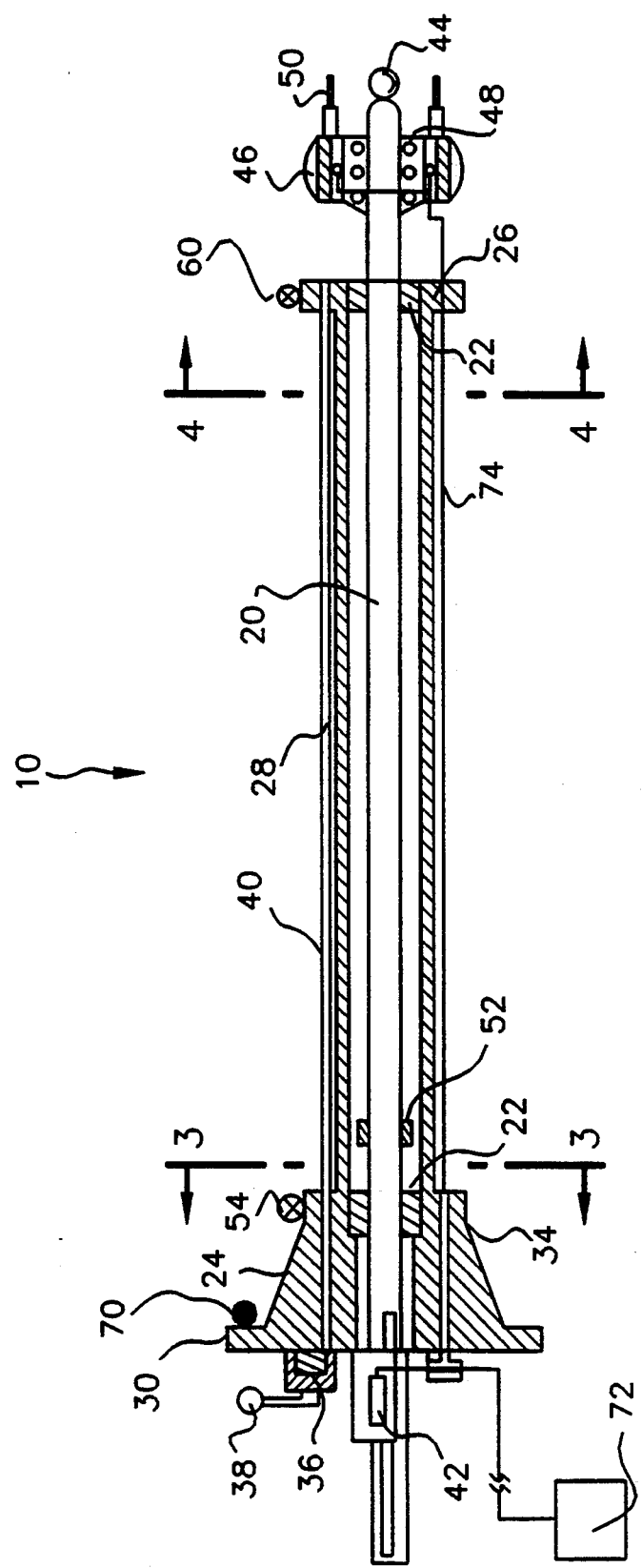
FIG. 1 is a cross sectional view of a projectile ram depth and orientation gauge within the scope of the present invention.

FIG. 1 shows a projectile ram depth and orientation gauge 10 according to a preferred embodiment of the present invention. This embodiment is a measuring device which is referred to in the field of U.S. Army artillery cannonry as a Projectile RAM Depth Orientation Gauge (RAMDOG). The preferred embodiment gauge 10 is basically made of light weight aluminum, nylon, and/or similar materials. The gauge 10 when inserted in a breech chamber 12 of a bore 14 of a cannontube 16 (see FIG. 2) can measure not only the depth of ram of a seated projectile 18, but also can measure the plane of orientation of the projectile 18 from the normal with respect to the centerline of the cannontube 16.

Figure 2:
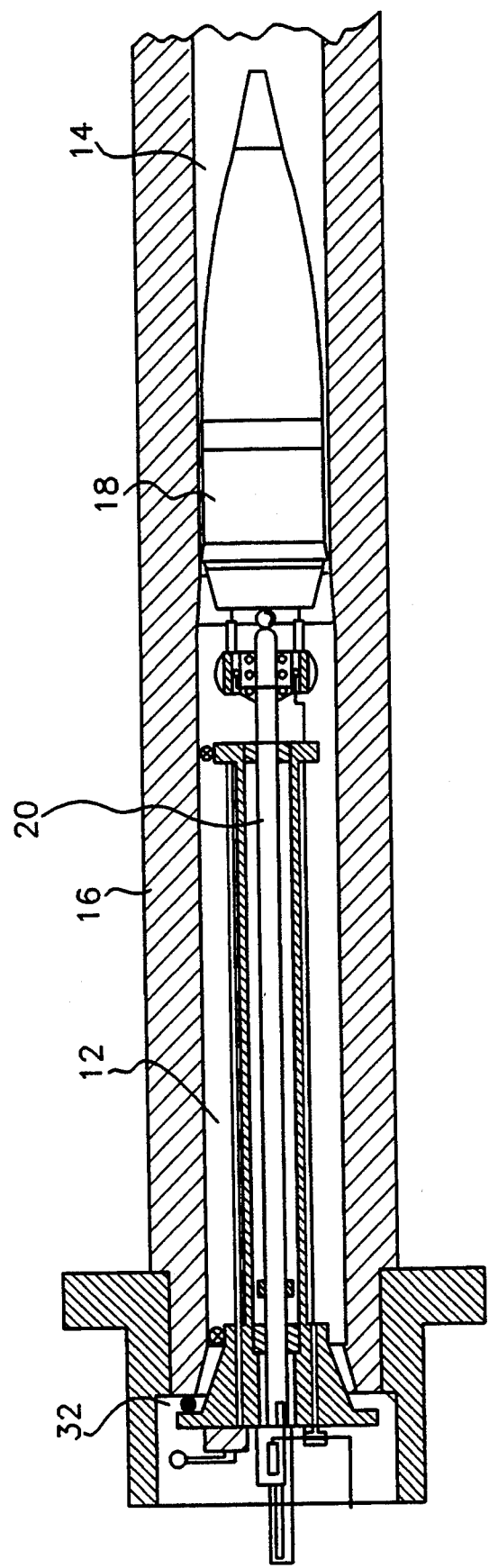
FIG. 2 is a cross sectional view of the gauge inserted within the breech chamber of a cannontube during its measuring operation.

The gauge 10 is an elongated body substantially corresponding to the dimensions of the interior wall of the breech chamber 12 when the gauge 10 is inserted through the rearward open end of the cannontube 16. The elongated body of the gauge 10 has a shaft 20 disposed therein. The shaft 20 is axially mounted on two bushings 22 which are positioned in a spaced relationship from each other. The shaft 20 is free to move axially fore and aft within the gauge body 10 for the purpose of obtaining measurements and is radially timed to maintain consistent and repeatable measurement locations while moving fore and aft. The housing for the gauge 10 includes a conical shaped disk 24 mounted on one end (the head portion) of the shaft 20, a small disk 26 mounted on the other end (the foot portion), and a tubular member 28 integrally connecting the disks 24, 26 and forming an integral single-piece housing structure. The gauge 10 as seen in FIG. 2 is seated within the breech chamber 12. The head portion of the gauge 10 having the conical shaped disc 24 is located adjacent to the entrance of the breech chamber 12. The foot portion of the gauge 10 having the disk 26 is located within the breech chamber 12 adjacent to the cannontube bore 14 housing the projectile 18. The disks 24, 26 are concentrically supported by the bushings 22 on the shaft 20. The conical shaped disk 24 is provided with a flange 30 at its maximum diameter end. The flange 30 is constructed to extend outwardly in a perpendicular manner with respect to the shaft 20 and is adjacent to a face 32 of the cannontube 16. Further, at its minimum diameter end of the disk 24 there is provided a flange 34 that extends outwardly and is parallel to shaft 20.

A small hydraulic actuator device 36 is mounted on the conical shaped disk 24. The actuator 36 is operated by a control handle lever 38 and supplies hydraulic pressure to a hydraulic conduit 40. The conduit 40 passes through the disks 24, 26 and is parallel to the adjacent tubular member 28 and shaft 20. Further, a linear measuring scale device 42 is mounted on the conical shaped disk 24. The scale device 42 has a digital measuring scale which has its read out tape operatively connected to the shaft 20. The scale device 42 constitutes a digital caliper readout unit and provides data for calculating the ram depth travel distance dimension from the cannontube face 32 to the base of the projectile 18.

A small tooling ball 44 is mounted at the foot end of the shaft 20. The tooling ball 44 is a precision ground and solid hardened ball member which constitutes a contact surface for the gauge 10 on the base of the projectile 18. Located equally and circumferentially around the tooling ball 44 are three electronic depth micrometers or digital depth indicators 46 which are mounted on conventional adjustable mounts 48 (for calibration purposes). The depth indicators 46 have appropriate feeler means 50 for contacting the base of the projectile 18. The tooling ball 44 defines the true orientation of the gauge 10 to the known centerline of the cannontube 16.

The shaft 20 is termed a measuring device and has a known overall effective length. The shaft 20 utilizes a stop collar 52 which is located adjacent to the conical shaped disk 24. The collar 52 limits the movement of the shaft 20 within the housing of gauge 10 and thus, provides a known constant length dimension between the collar 52 and the tooling ball 44.

Figure 4:
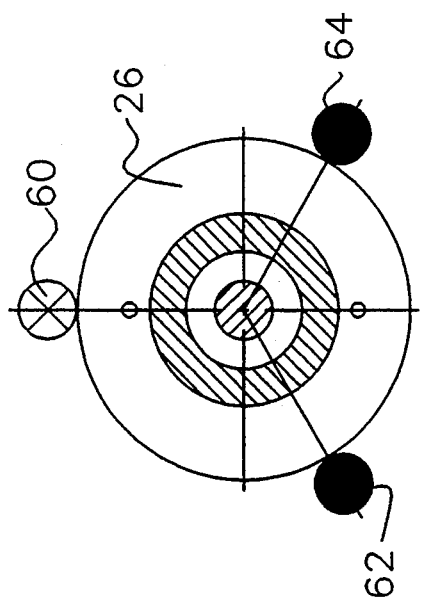
FIG. 4 is a side view, taken along line 4—4 of FIG. 1, of the foot disk of the gauge.
Figure 3:
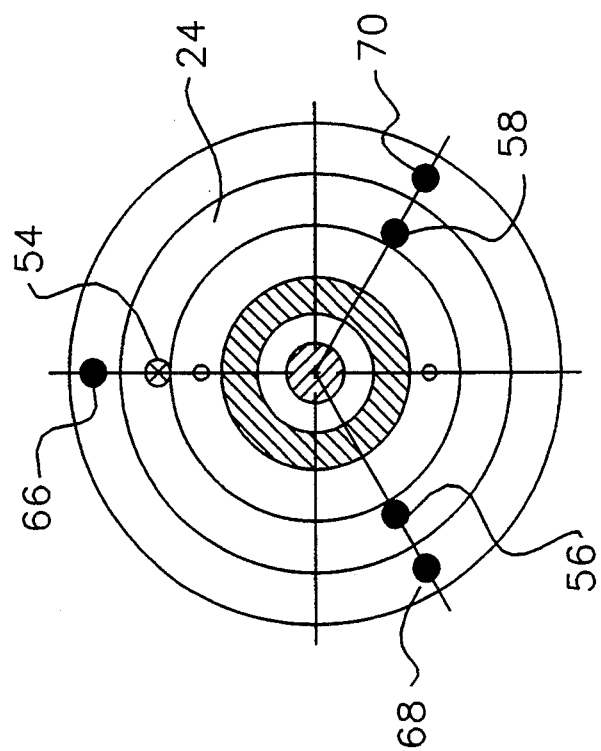
FIG. 3 is a side view, taken along line 3—3 of FIG. 1, of the conical shaped head disk of the gauge.

The gauge 10 is provided with a number of small fixedly mounted spherical shaped pad members which constitute points of contact between the gauge 10 and the cannontube 16. The pad members are constructed either as solid hardened balls (similar to tooling ball 44) or as flexible mounted spherical bodies. Three pad members 54, 56, 58 are mounted on an outer edge of the flange 34 of the conical shaped disk 24 (see FIG. 3). The pads 54, 56, 58 are termed cannontube centerline locator points and are equally spaced and radially arranged on the disk 24. Additionally, similar cannontube centerline locator points or pads 60, 62, 64 are mounted on the outer edge of the disk 26 (see FIG. 4). Pads 54 and 60 are the flexible pads and 56, 58, 62, and 64 are the solid hardened ball type. Pads 54 and 60 are provided with hydraulic actuated and spring actuated means to provide its flexible characteristic. The conduit 40 and associated fluid channels in the head disk 24 and the foot disk 26 operatively connect the hydraulic actuator 36 with the flexible locator points 54 and 60. The hydraulic actuator 36 when operational, applies hydraulic pressure to these actuated pads, causing them to expand outwardly under positive hydraulic pressure towards the wall of the breech chamber 12 of the cannontube 16. Under pressure loss the actuated pads by virtue of the tension spring means will contract. Additionally, three pads 66, 68, 70 are equally spaced and radially mounted on the disk flange 30 and are termed cannontube face locator points, abutting the cannontube face 32. The pads 66, 68, 70 are constructed as the solid hardened ball type.

These multiple sets of pads allow the gauge 10 to be the abutment means with the cannontube breech 12 and cannontube face 32. Accordingly, it is readily seen that the gauge 10 may be readily inserted within the cannontube breech 12 for the measuring operation and may be removed therefrom at its completion.

A data logger 72 records electronically the measured data sent via data line 74 by the digital depth indicators 46 and also by the linear measuring scale device 42 for down loading to a computer (not shown) for analysis and storage.

OPERATION OF THE GAUGE

Initially, the gauge 10 is verified for calibration and a determination is made that all of the measuring devices of the gauge 10 are zeroed and ready for operation. Then the gauge 10 is readied for use by plugging the linear measuring scale device 42 and the digital depth indicators 46 into the data logger 72. After verification that the gauge 10 is operational, it is positioned for insertion into the breech area 12 of the cannontube 16. All locating pad points are wiped clean to be free of any dust or dirt (the breech chamber 12 and cannontube face 32 must also be wiped clean and be free of any dust or dirt prior to insertion of the gauge 10); then the hydraulic actuator 36 is set in the retracted mode so the flexible cannontube centerline locator pad points are in their retracted position, which allows the gauge 10 to be inserted into the cannontube breech chamber 12. Next, the gauge 10 is pushed into the breech chamber 12 until the cannontube face 30 locating pad points 66, 68, 70 are firmly seated against the cannontube face 32. Then a visual check is made to insure that the gauge 10 is radially timed. This is accomplished with a mechanical timing stop (not shown) or a master precision cross level (not shown). When this has been verified, the hydraulic actuator 36 is then actuated by throwing the lever 38. Hydraulic pressure is applied to the flexible cannontube centerline locator pad points 54, 60, causing them to expand outwardly towards the interior breech chamber wall of the cannontube 16. As these pad points expand and contact the breech chamber wall, the pad points 54, 60 lock the gauge 10 in place and thus, distribute the hydraulic pressure equally over the cannontube centerline locator pad points. This action locates and locks the gauge 10 coincidentally with the centerline of the cannontube 16. In the next step the measuring shaft 20 is pushed forward for contact with the base of the projectile 18. As the measuring shaft 20 approaches the projectile 18, the feeler rods 50 of the digital depth indicators 46 contact the projectile base shortly before the tooling ball 44 contacts the same. The digital depth indicators 46 now contact the projectile base and transmit comparative measurement data to the data logger 72. Simultaneously the tooling ball 44 contacts the projectile base and the linear measurement scale device 42 transmits the ram depth measurements to the data logger 72. The three digital depth indicators 46 have now defined the plane of orientation in which the projectile 18 lies in the cannontube bore 14, and simultaneously, the physical dimension is recorded for the depth that the projectile 18 has been rammed and seated in the lands and grooves of the rifling of the cannontube bore 14. Once these measurements are electronically recorded, the gauge 10 is ready to be removed from the cannontube breech chamber 12. The measuring shaft 20 is pulled outwardly until its stop collar 52 rests against the bushing 22 on the gauge housing, then the hydraulic actuator lever 38 is reversed, releasing the pressure on the expanded locator pad points 54, 60 allowing them to retract into their rest position. At this time, the gauge 10 is free to be removed from the interior of the cannontube breech chamber 12. Thus, the measured data is recorded via data line 74 by the data logger 72 and stored and analyzed by the computer.

Having thus described a specific preferred embodiment of the invention, it will be appreciated by those skilled in the art that variations are possible within the scope of the invention. The combination projectile ram depth and orientation gauge of the present invention can be used with any type of cannontube (or guntube) where it is necessary to measure the depth of the projectile inside the cannontube after the projectile has been rammed and seated in the cannontube bore and also to measure any deviation of orientation from the normal with respect to the centerline of the cannontube. Further, it is considered within the scope of the present invention to construct the pad members in other shapes such as cylindrical rods, and the like. Consequently, it is intended that the invention not be limited to the disclosed embodiment as illustrated in the drawings and described in the specification, but rather that it be defined solely in accordance with the appended claims.

What is claimed is:

1. A combination gauge for measuring both the depth of a projectile inside a cannontube bore after it has been rammed and seated in the lands and grooves of the rifling of the cannontube and the angular deviation of orientation of the projectile from its normal position with respect to the centerline of the cannontube, the cannontube comprises an elongated chamber having a forward section for housing the projectile and having a forward open end and a rear section constituting the breech chamber and having a rearward open end; the gauge comprising in combination:

an elongated body substantially corresponding to the dimensions of the breech chamber when inserted through the rearward open end of the cannontube;

a shaft member mounted centrally within the elongated body and adapted to move axially fore and aft in a radially timed manner for deriving the depth dimension measurement of the rammed/seated projectile in the cannontube bore;

means associated with the shaft member for aligning the shaft member within the breech chamber and positioning with the cannontube or breech face;

additional means associated with the shaft member for deriving the deviation of orientation measurement; and means for electronically recording the derived measurements.

2. A combination gauge as defined in claim 1, wherein the alignment means associated with the shaft member includes first and second disk means mounted on the shaft member in a spaced relationship to each other by a connecting tubular member.

3. A combination gauge as defined in claim 2, wherein the first disk means is conical in shape.

4. A combination gauge as defined in claim 3, wherein the conical shape disk has extending flange members at its respective ends.

5. A combination gauge as defined in claim 4, wherein the respective flange members of the conical shaped disk include pad members for abutting the interior wall of the cannontube breech chamber and the external face of the cannontube.

6. A combination gauge as defined in claim 1, wherein the alignment means associated with the shaft member includes pad members for contacting the interior wall of the cannontube breech chamber.

7. A combination gauge as defined in claim 6, wherein the pad members are spheres.

8. A combination gauge as defined in claim 6, wherein the pad members are equally spaced and radially arranged on the alignment means.

9. A combination gauge as defined in claim 6, wherein selective pad members are solid spherical members.

10. A combination gauge as defined in claim 6, wherein selective pad members are expansible and retractable spherical bodies.

11. A combination gauge as defined in claim 2, wherein the second disk means includes pad means for abutting the interior walls of the cannontube breech chamber.

12. A combination gauge as defined in claim 1, wherein the additional means associated with the shaft member contact the base of the projectile for deriving the deviation of orientation measurement.

13. A combination gauge as defined in claim 10 and includes means for supplying hydraulic pressure to the selective pad members whereby the pad members contact the interior wall of the cannontube breech chamber during expansion.

14. A combination gauge as defined in claim 13, wherein the means for supplying hydraulic pressure is a hydraulic actuator device.

15. A combination gauge as defined in claim 1, wherein the gauge is made of aluminum, and/or nylon.

16. A combination gauge as defined in claim 1, wherein the electronically recording means for recording is a data logger.

17. A combination gauge as defined in claim 1 and includes a tooling ball member mounted on the end of the shaft member and operatively contacting the rear of the projectile for determining the depth of the ram measurement.

18. A combination gauge as defined in claim 1 and includes an electronic digital measuring scale device operatively attached to the measuring shaft member, the scale device providing travel distance data for calculating the ram depth measurements.

19. A combination gauge as defined in claim 18 and includes digital depth indicator means operatively attached to the measuring shaft member whereby the digital depth indicator means and the linear measuring scale device down load to a computer for data storage and analysis.

20. A combination gauge for measuring both the depth of a projectile inside a cannontube bore after it has been rammed and seated in the lands and grooves of the rifling of the cannontube bore and the deviation of orientation of the seated projectile normal to the centerline of the cannontube, the cannontube comprises an elongated bore chamber having a forward section for housing the projectile and having a forward open end and a rear section constituting the breech chamber and having a rearward open end;

the gauge comprising in combination:

an elongated body substantially corresponding to the dimensions of the breech chamber when inserted through the rearward open end of the cannontube;

a shaft member mounted centrally within the elongated body and adapted to move axially fore and aft for deriving the depth dimension measurement of the rammed projectile;

first and second disk means mounted on the shaft member in a spaced relationship by a connecting tubular member for aligning the shaft member within the breech chamber and abutting the interior wall of the cannontube bore;

additional means associated with the shaft member for deriving the deviation of orientation measurement; and means for electronically processing the derived measurements.

21. A portable gauge device for quantifying the measurements of the seated depth of a rammed projectile in a guntube bore and for verifying any deviation of orientation of the projectile normal to the centerline of the guntube;

comprising in combination:

an elongated body adapted to be inserted in the breech chamber of the guntube;

a shaft member mounted centrally within the elongated body and adapted to move axially fore and aft for deriving the depth dimension measurement of the breech chamber;

means associated with the shaft member for aligning the shaft member within the breech chamber;

additional means associated with the shaft member for deriving the deviation orientation measurement; and means for electronically processing the derived measurements.

22. A combination gauge as defined in claim 21, wherein the alignment means associated with the shaft member includes first and second disk means mounted on the shaft member in a spaced relationship to each other by a connecting tubular member.

23. A combination gauge as defined in claim 21, wherein the alignment means associated with the shaft member includes pad members for contacting the interior wall of the guntube bore.

* * * * *